US007352352B2

(12) United States Patent
Oh et al.

(10) Patent No.: US 7,352,352 B2
(45) Date of Patent: Apr. 1, 2008

(54) LIQUID CRYSTAL DISPLAY DEVICE AND CONTROLLING METHOD THEREOF

(75) Inventors: Eui Yeol Oh, Kyounggi-do (KR); Tae Ho You, Incheon-shi (KR); Hee Jeong Park, Kyounggi-do (KR); Ki Duk Kim, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 697 days.

(21) Appl. No.: 10/876,722

(22) Filed: Jun. 28, 2004

(65) Prior Publication Data

US 2005/0140640 A1 Jun. 30, 2005

(30) Foreign Application Priority Data

Dec. 29, 2003 (KR) ...................... 10-2003-0099331

(51) Int. Cl.
*G09G 3/36* (2006.01)
*H04N 5/14* (2006.01)

(52) U.S. Cl. ....................................... 345/102; 348/672

(58) Field of Classification Search ................ 345/102; 348/672

See application file for complete search history.

(56) References Cited

U.S. PATENT DOCUMENTS 6,130,724 A * 10/2000 Hwang ....................... 348/678
6,388,388 B1 * 5/2002 Weindorf et al. ......... 315/169.3
6,700,628 B1 * 3/2004 Kim ............................ 348/687
6,873,729 B2 * 3/2005 Matsushima ................. 382/167
2003/0001815 A1 * 1/2003 Cui ............................ 345/102
2003/0002736 A1 * 1/2003 Maruoka et al. ............ 382/168
2005/0219199 A1 * 10/2005 Huang et al. ............... 345/102
2006/0108527 A1 * 5/2006 Fujita et al. ................ 250/310
2007/0024582 A1 * 2/2007 Kamimura .................. 345/156

* cited by examiner

*Primary Examiner*—Amare Mengistu
*Assistant Examiner*—Elijah M Sheets
(74) *Attorney, Agent, or Firm*—McKenna, Long & Aldridge LLP

(57) ABSTRACT

The liquid crystal display device includes a histogram analyzer analyzing a histogram of an input image and determining the input image as being in one of a low brightness mode, a normal mode, and a high brightness mode based on the histogram analysis, a back light controller controlling a maximum brightness of a back light unit based on the mode determination, and a data modulator enlarging the histogram of the input image to modulate data of the input image. The histogram analyzer detects a most frequent value of gray scale occurring most frequently in the input image of one frame, compares the most frequent value with a predetermined low reference gray value and a predetermined high reference gray value, and determines the input image as in one of the low brightness mode, the normal mode, and the high brightness mode based on the compared result.

19 Claims, 14 Drawing Sheets

LIQUID CRYSTAL DISPLAY DEVICE AND CONTROLLING METHOD THEREOF

The present invention claims the benefit of Korean Patent Application No. 2003-99331 filed in Korea on Dec. 29, 2003, which is hereby incorporated by reference.

BACKGROUND OF THE INVENTION

1. Field of the Invention

The present invention relates to a liquid crystal display device and a controlling method thereof, and more particularly, to a liquid crystal display device and a controlling method thereof that have an active control of brightness.

2. Discussion of the Related Art

In general, a liquid crystal display device controls light transmissivity of liquid crystal cells in accordance with image data to display pictures. In particular, a transmissive type liquid crystal display device includes a back light unit on a rear surface of a liquid crystal display panel to irradiate light on the liquid crystal display panel.

FIG. 1 is a schematic configuration of a transmissive type liquid crystal display device according to the related art. In FIG. 1, the liquid crystal display device includes a back light unit 12 on a rear surface of a liquid crystal display panel 11. The liquid crystal display panel 11 includes a liquid crystal layer (not shown). In addition, the liquid crystal panel 11 receives video data, RGB, and adjusts a light transmittance of the liquid crystal layer based on the video data, thereby controlling a transmission of light irradiated from the back light unit 12 to display an image.

The back light unit 12 includes a light guide plate (not shown) for converting light from a line light source into surface light, and a diffusion sheet and an optical sheet (not shown) for improving uniformity and efficiency of the light. The line light source includes a lamp having a discharge tube for generating white light in accordance with a tube current received from an inverter 14. The inverter 14 converts DC power from a power supply 13 into AC power and boosts the AC power, to thereby generate the tube current.

However, a brightness of the back light unit 12 is fixed. Thus, the liquid crystal display device according to the related art has a lower display brightness in comparison with a cathode ray tube (CRT) display device. Further, the liquid crystal display device according to the related art has a fixed maximum brightness and a low contrast ratio, such that display quality deteriorates.

SUMMARY OF THE INVENTION

Accordingly, the present invention is directed to a display device and a driving method thereof that substantially obviate one or more of problems due to limitations and disadvantages of the related art.

An object of the present invention is to provide a liquid crystal display device and a controlling method thereof that have an active control of brightness, increase a brightness ratio and improve display quality.

Another object of the present invention is to provide a liquid crystal display device and a controlling method thereof that reduce power consumption and heating of a back light unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes a histogram analyzer analyzing a histogram of an input image and determining the input image as being in one of a low brightness mode, a normal mode, and a high brightness mode based on the histogram analysis, and a back light controller controlling a maximum brightness of a back light unit based on the mode determination.

In another aspect, the liquid crystal display device includes a histogram analyzer analyzing a histogram of an input image and determining the input image as being in one of a low brightness mode, a normal mode, and a high brightness mode based on the histogram analysis, a back light controller controlling a maximum brightness of a back light unit based on the mode determination, and a data modulator enlarging the histogram of the input image to modulate data of the input image.

In another aspect, the method of controlling a liquid crystal display device includes analyzing a histogram of input image, determining the input image as being in one of a low brightness mode, a normal mode, and a high brightness mode based on the histogram analysis, and controlling a maximum brightness of a back light unit based on the mode determination.

In another aspect, the method of controlling a liquid crystal display device includes analyzing a histogram of an input image, determining the input image as being in one of a low brightness mode, a normal mode, and a high brightness mode based on the histogram analysis, controlling a maximum brightness of a back light unit based on the mode determination, and enlarging the histogram of the input image to modulate data of the input image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
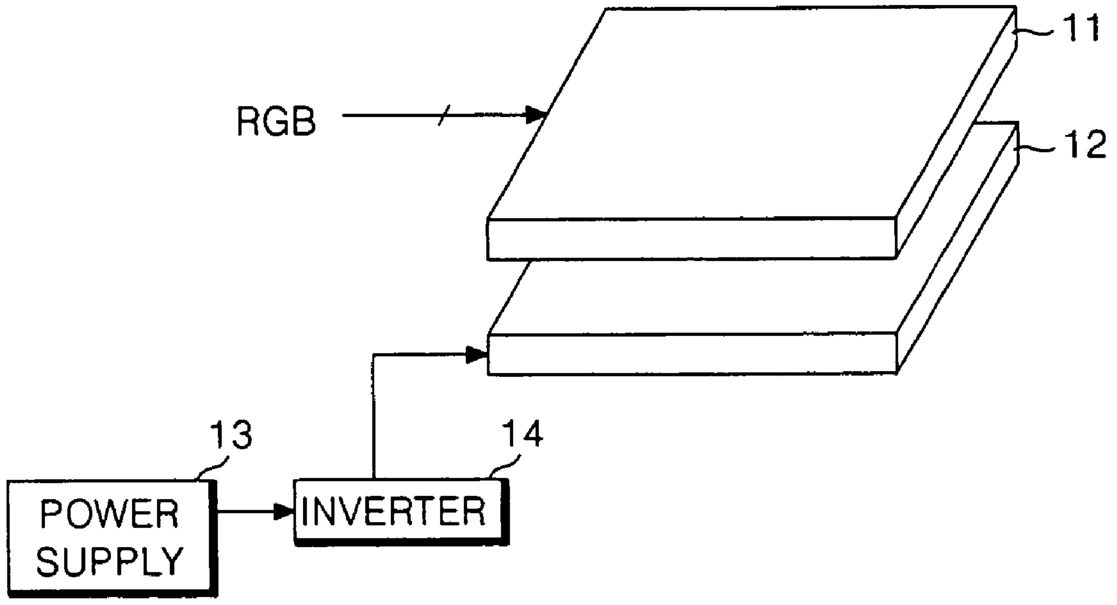
FIG.1 RELATED ART
FIG. 1 is a schematic configuration of a transmissive type liquid crystal display device according to the related art.
Figure 2:
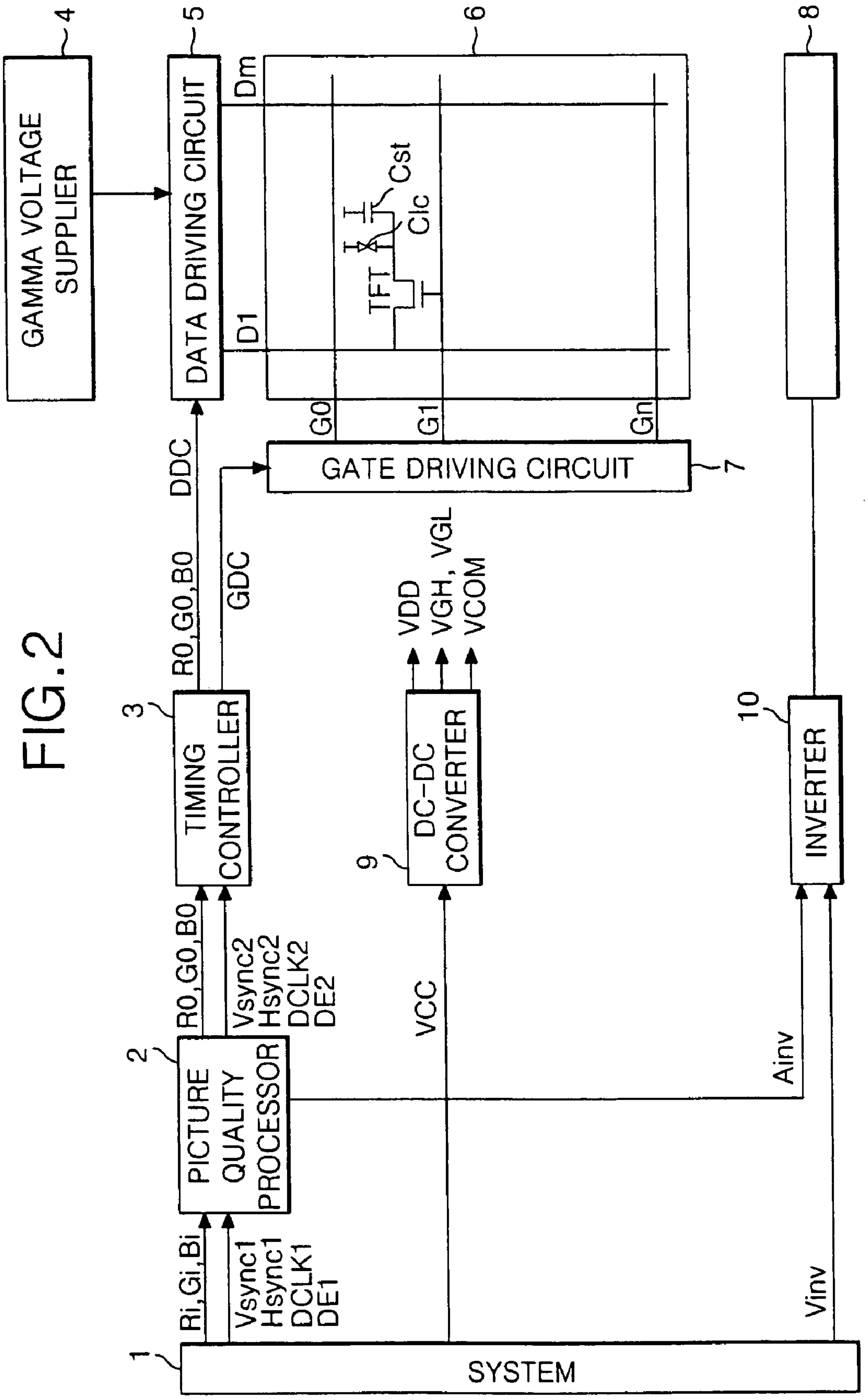
FIG. 2 is a block diagram of a liquid crystal display device according to an embodiment of the present invention.

FIG. 2 is a block diagram of a liquid crystal display device according to an embodiment of the present invention. In FIG. 2, a liquid crystal display device may include a system 1, a picture quality processor 2, a timing controller 3, a gamma voltage supplier 4, a data driving circuit 5, a liquid crystal display panel 6, a gate driving circuit 7, a back light unit 8, a DC-DC converter 9, and an inverter 10.

The liquid crystal display panel 6 may have a liquid crystal material injected between upper and lower substrates (not shown). The liquid crystal display panel 6 also may have m number of data lines D1 . . . Dm and n number of gate lines G1 . . . Gn formed on the lower substrate crossing each other perpendicularly and defining m×n liquid crystal cells Clc arranged in a matrix. The liquid crystal panel 6 also may have a dummy gate line G0. A thin film transistor TFT may be formed in each of the liquid crystal cells Clc for switching data voltage signals applied to the data lines D1 . . . Dn to the respective liquid crystal cells Clc in response to scanning signals from the gate lines G1 . . . Gn, thereby driving a pixel electrode of the respective liquid crystal cells Clc. In addition, a storage capacitor Cst may be formed in each of the liquid crystal cells Clc between the pixel electrode and the pre-stage gate line or between the pixel electrode and a common electrode line (not shown), thereby constantly keeping a voltage of the liquid crystal cell Clc.

Further, the liquid crystal display panel 6 may have a black matrix, color filters and common electrodes (not shown) formed on the upper substrate. A polarizer having a perpendicular light axis (not shown) may be formed on a light emission surface of the upper glass substrate and on a light incident surface of the lower glass substrate. An alignment film for establishing a free-tilt angle of the liquid crystal material (not shown) also may be formed on another surface of the lower glass substrate facing the liquid crystal material and on another surface of the upper glass substrate facing the liquid crystal material.

The system 1 may include a graphic processing circuit (not shown) for converting analog input data to digital video data corresponding to three primary colors, Ri, Gi, and Bi and for adjusting a resolution and a color temperature of the digital video data, Ri, Gi, and Bi. In addition, the graphic processing circuit may generate timing signals, such as a vertical synchronization signal Vsync1, a horizontal synchronization signal Hsync1, a dot clock signal DCLK1, and a data enable signal DE1, from the system 1. The dot clock DCLK1 may relate to a sampling of the digital video data, Ri, Gi, and Bi, and the data enable signal DE1 may relate to a duration for the presence of the digital video data, Ri, Gi and Bi. Further, the system 1 may generate a power voltage VCC and a DC input voltage Vinv.

The picture quality processor 2 may receive the digital video data, Ri, Gi, and Bi, from a system 1, and may modulate the received video data, Ri, Gi, and Bi, to modulated video data, Ro, Go, and Bo, respectively. In particular, the picture quality processor 2 may analyze a histogram of the digital video data, Ri, Gi, and Bi, by enlarging the histogram and by categorizing the histogram to one of three predetermined modes. The three predetermined modes may include a normal mode, a high brightness mode, and a low brightness mode. Based on the histogram mode categorization, the picture quality processor 2 may individually control an output tube current for each lamp of the back light unit 8 by generating and applying a control signal Ainv to the inverter 10, to thereby control a brightness of the back light unit 8.

In addition, the picture quality processor 2 may also receive from the system 1 the timing signals, Vsync1, Hsync1, DCLK1, and DE1, from the system 1. The picture quality processor 2 also may modulate the received timing signals, Vsync1, Hsync1, DCLK1, and DE1, to modulated timing signals, Vsync2, Hsync2, DCLK2, and DE2, respectively. The picture quality processor 2 may then apply the modulated video data, Ro, Go, and Bo, and the modulated timing signals, Vsync2, Hsync2, DCLK2, and DE2, to the timing controller 3.

The timing controller 3 may apply the modulated video data, Ro, Go, and Bo, to the data driving circuit 5. The timing controller 3 also may generate control signals, DDC and GDC, for controlling the gate driving circuit 7 and the data driving circuit 5 based on the modulated timing signals, Vsync2, Hsync2, DCLK2, and DE2. The control signal GDC may include a gate start pulse GSP, a gate shift clock GSC, and a gate output enable GOE (not shown). The control signal DDC may include a source start pulse SSP, a source shift clock SSC, a source output enable SOE, and a polarity POL (not shown).

In addition, the gamma voltage supplier 4 may generate analog gamma compensation voltages to be applied to the data driving circuit 5. The gamma voltage supplier 4 may divide a high potential power voltage and a low potential power voltage, which may be a ground voltage, to generate the analog gamma compensation voltages. Each of the analog gamma compensation voltages may correspond to gray level of each of the digital video data, Ro, Go, and Bo.

The DC-DC converter 9 may receive the power voltage VCC from the system 1 to generate a high potential power voltage VDD, a common voltage VCOM, a gate high voltage VGH and a gate low voltage VGL, for driving the liquid crystal display panel 6. The common voltage VCOM may be applied to the common electrode of the liquid crystal cell Clc. The gate high voltage VGH may be a high logical voltage of the scanning pulse having a voltage higher than a threshold voltage of the TFT. In addition, the gate low voltage VGL may be a low logical voltage of the scanning pulse having a voltage equal to an off-voltage of the TFT.

Further, the data driving circuit 5 may convert the digital video data, Ro, Go, and Bo, based on the analog gamma compensation voltages and the control signal DDC, to the data voltage signals. The data driving circuit 5 may then apply the data voltage signals to the data lines D1 . . . Dm of the liquid crystal display panel 6. In addition, the gate driving circuit 7 may general the scanning signals based on the high potential power voltage VDD, the common voltage VCOM, the gate high voltage VGH, the gate low voltage VGL, and the control signal GDC. The gate driving circuit 7 may sequentially apply the scanning signals to the gate lines G1 . . . Gn, to thereby selectively turn-on a horizontal line of the liquid crystal display panel 6 to which the data signal is applied.

Moreover, the inverter 10 may receive the DC input voltage Vinv from the system 1, may convert the DC input voltage Vinv to an AC voltage, and may use a pulse width modulation (PWM) or a pulse frequency modulation (PFM) to boost the AC voltage, thereby generating an AC tube current. A lamp of the back light unit 8 then may be driven based on the AC tube current to irradiate light to the liquid crystal display panel 6. In addition, the inverter 10 may alter a duty ratio and a brightness intensity of the lamp of the back light unit 8 in accordance with the control signal Ainv received from the picture quality processor 2. The duty ratio of the lamp tube current may represent a ratio of the lamp's turn-on period during one frame interval.

Figure 3:
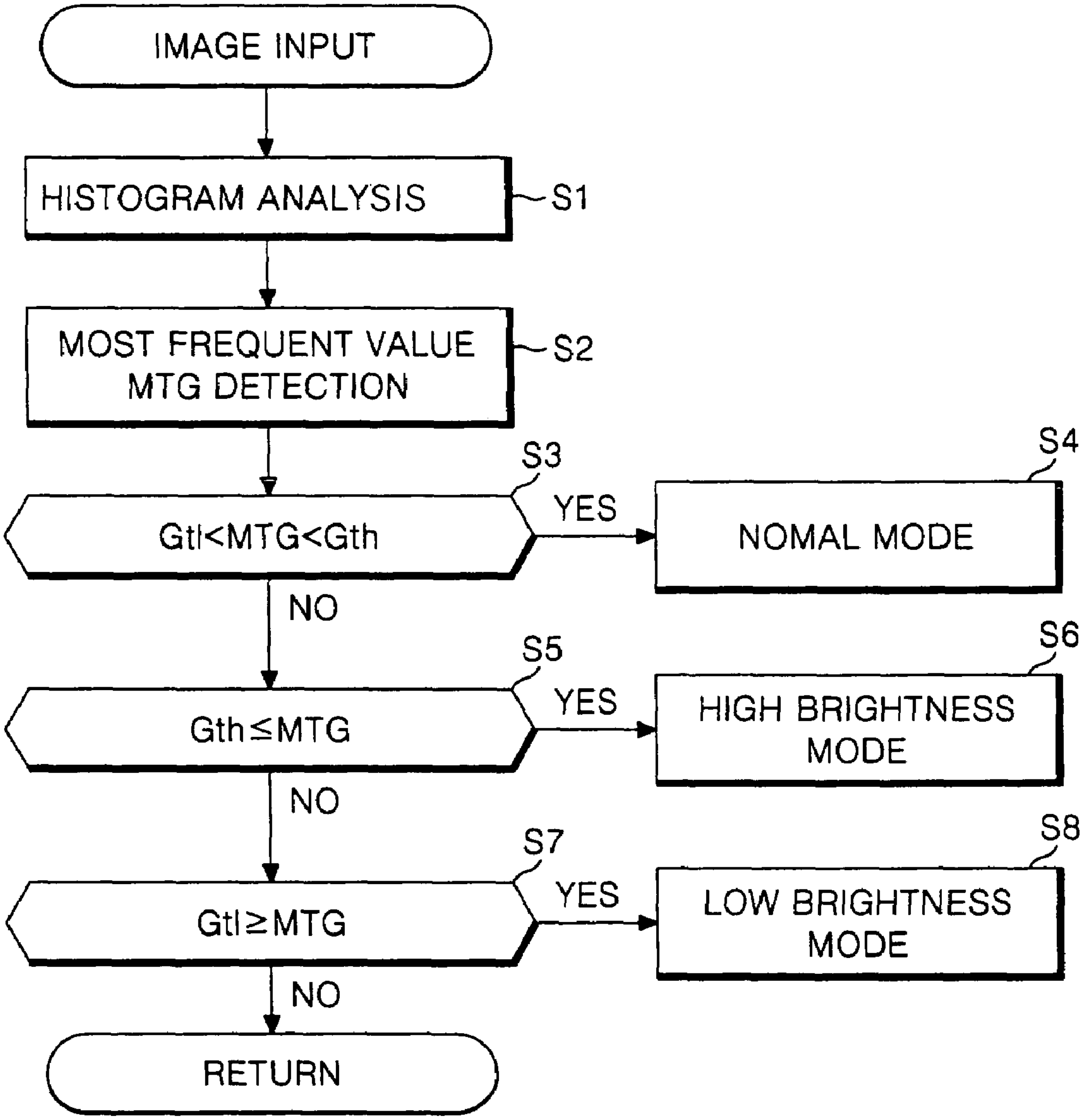
FIG. 3 is a flow chart of a driving method of a back light unit according to an embodiment of the present invention.

FIG. 3 is a flow chart of a driving method of a back light unit according to an embodiment of the present invention. As shown in FIG. 3, image input data may be received by the picture quality processor 2 (shown in FIG. 2) and a processing of the image input data may be carried out by the picture quality processor 2. At step S1, a histogram analysis may be performed. The histogram may reflect frequency of gray level for each of the image input data. For example, in a dark image, there are more data having a low gray scale reflecting a low brightness than data having a high gray scale reflecting high brightness. On the contrary, in a bright image, there are more data having a high gray scale than data having low gray scale.

At step S2, a most frequent value detection may be performed for determining a most frequent value MTG representing a gray level value that occurs most often within one frame of the image data. At steps S3-S7, the histogram may be categorized into one of the three predetermined modes based on the most frequent value MTG detected at step S2. For example, at step S3 if the most frequent value MTG is further determined to be between a predetermined low reference gray scale Gtl and a predetermined high reference gray scale Gth, the histogram may be categorized as in the normal mode at step S4. Otherwise, at step S5 of FIG. 3, if the most frequent value MTG is then determined to be equal or greater than the predetermined high reference gray scale Gth, the histogram may be categorized as in the high brightness mode at step S6. Further otherwise, at step S7 of FIG. 3, if the most frequent value MTG is determined to be equal or less than the predetermined low reference gray scale Gtl, the histogram may be categorized as in the low brightness mode at step S8.

Figure 4:
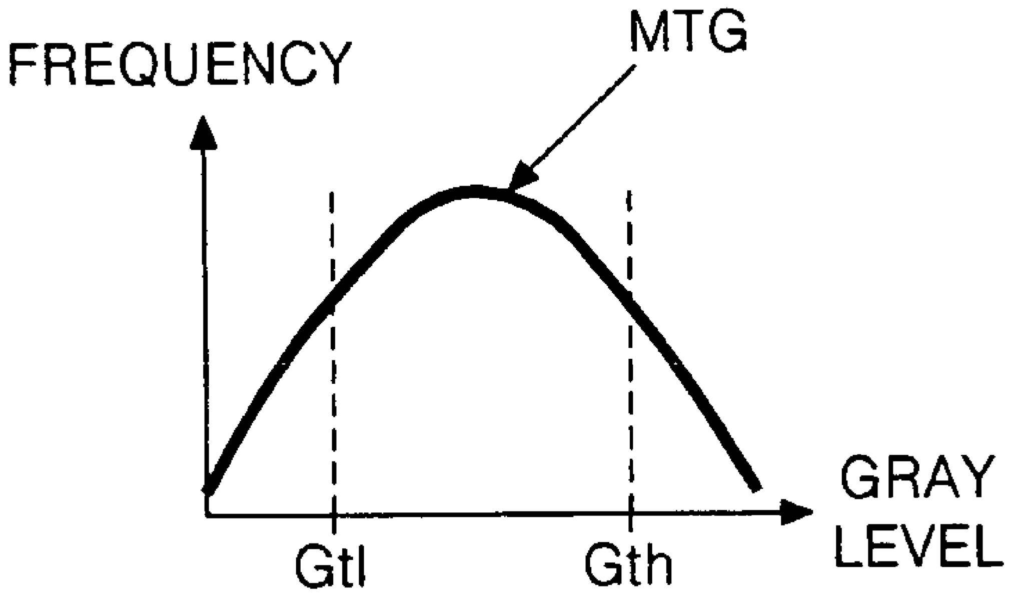
FIG. 4 is a graph of an example of a histogram in the normal mode in FIG. 3.
Figure 5:
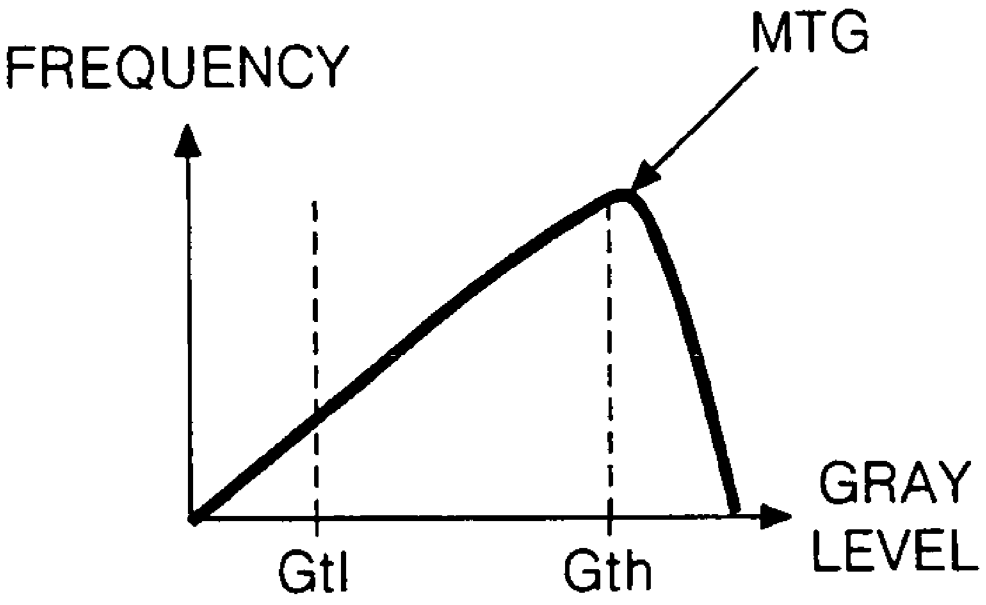
FIG. 5 is a graph of an example of a histogram in the high-brightness mode in FIG. 3.
Figure 6:
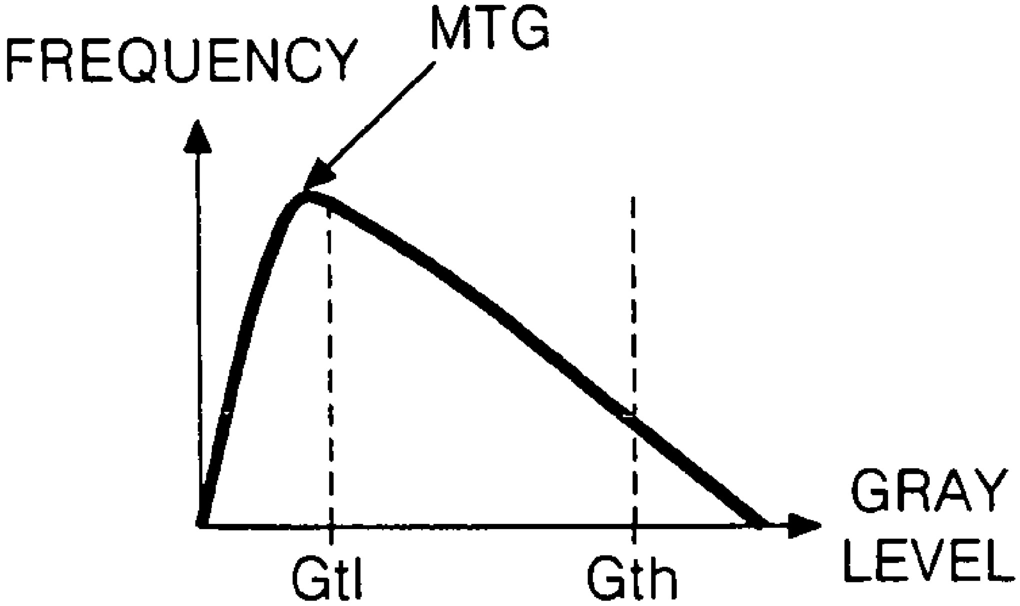
FIG. 6 a graph of an example of a histogram in the low-brightness mode in FIG. 3.

FIG. 4 is a graph of an example of a histogram in the normal mode in FIG. 3, FIG. 5 is a graph of an example of a histogram in the high-brightness mode in FIG. 3, and FIG. 6 a graph of an example of a histogram in the low-brightness mode in FIG. 3. As shown in FIG. 4, a gray level value that occurs most often within one frame of the image data may be between the predetermined low reference gray scale Gtl and the predetermined high reference gray scale Gth, and the image data then may be determined as in the normal mode. As shown in FIG. 5, a gray level value that occurs most often within one frame of the image data may be greater than the predetermined high reference gray scale Gth, and the image data then may be determined as in the high brightness mode. The high brightness mode image data may include an explosion image, a flash image or the like. As shown in FIG. 6, a gray level value that occurs most often within one frame of the image data is smaller than the predetermined low reference gray scale Gtl, and the image data then may be determined as in the low brightness mode. The low brightness mode data image may include an image of a dark sky or the like.

Subsequently, in accordance with the histogram analysis, the most frequent value detection, and the mode categorization, the picture quality processor 2 (shown in FIG. 2) may individually control an output tube current for each of the lamps of the back light unit 8 by generating and applying a control signal Ainv to the inverter 10. In particular, the duty ratio of the lamp tube current, the intensity (mA) of the tube current, and a brightness (nit) of each of the lamps may be controlled differently for image data in the normal mode, the high brightness mode, and the low brightness mode as shown Table 1 or as shown in Table 2.

TABLE 1

| | Duty ratio(%) of lamp tube current | Lamp tube current (mA) | Lamp brightness (nit) |
|---|---|---|---|
| High brightness mode | 100 | More than 6 | 450-500 |
| Normal mode | 60 | 4.5 | 300 |
| Low brightness mode | 30 | Less than 3 | 200 |

TABLE 2

| | Duty ratio(%) of lamp tube current | Lamp tube current (mA) | Lamp brightness (nit) |
|---|---|---|---|
| High brightness mode | 100 | More than 6 | 450-500 |
| Normal mode | 50~70 | 4.5 | 300 |
| Low brightness mode | 20~40 | Less than 3 | 200 |

In Tables 1 and 2, the duty ratio, the intensity (mA) of the tube current and the brightness of the lamp at each mode may be for a 30-inch liquid crystal television. In addition, the duty ratio, the intensity (MA) of the tube current and the brightness of the lamp as shown in Tables 1 and 2 may be altered depending on the particular resolution, the dimension or the model of the liquid crystal display device. Further, the duty ratio of the lamp tube current in Table 2 is derived from the margin of ±10% on the duty ratios of the lamp tube current in the normal mode and in the low brightness mode based on a property deviation of the liquid crystal display panel. In Tables 1 and 2, the lamp tube current in the normal mode may not be limited to 4.5 mA but may be a current between 3~6 mA.

Figure 7:
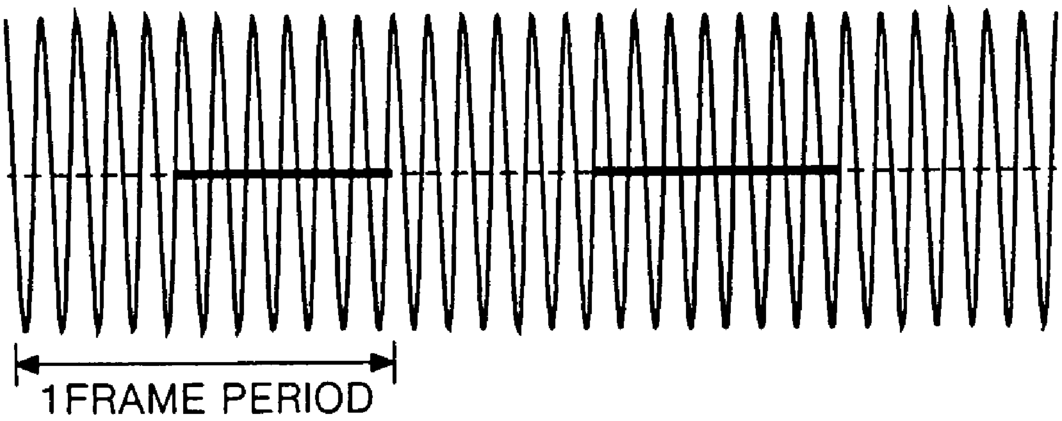
FIG. 7 is a waveform diagram of an example of a tube current in the high-brightness mode in FIG. 3.
Figure 8:
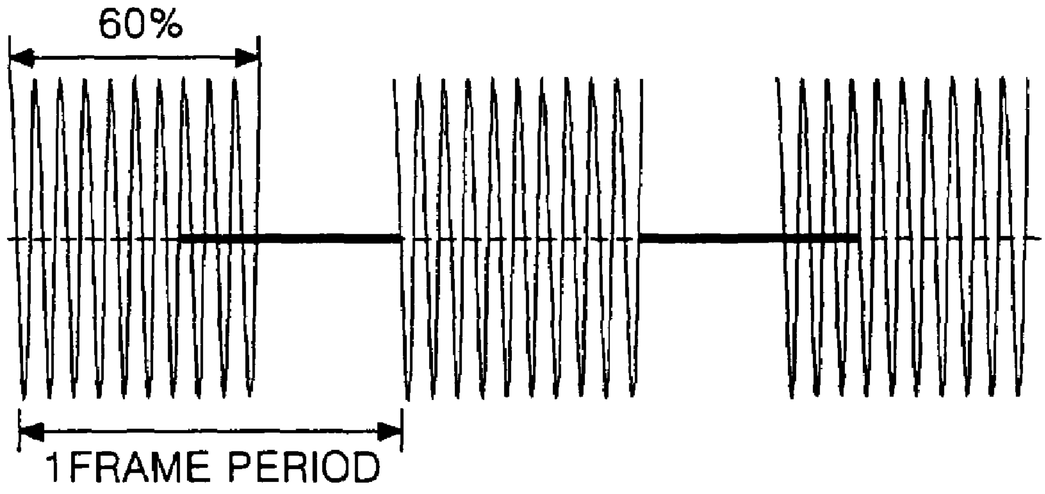
FIG. 8 is a waveform diagram of an example of a tube current in the normal mode in FIG. 3.
Figure 9:
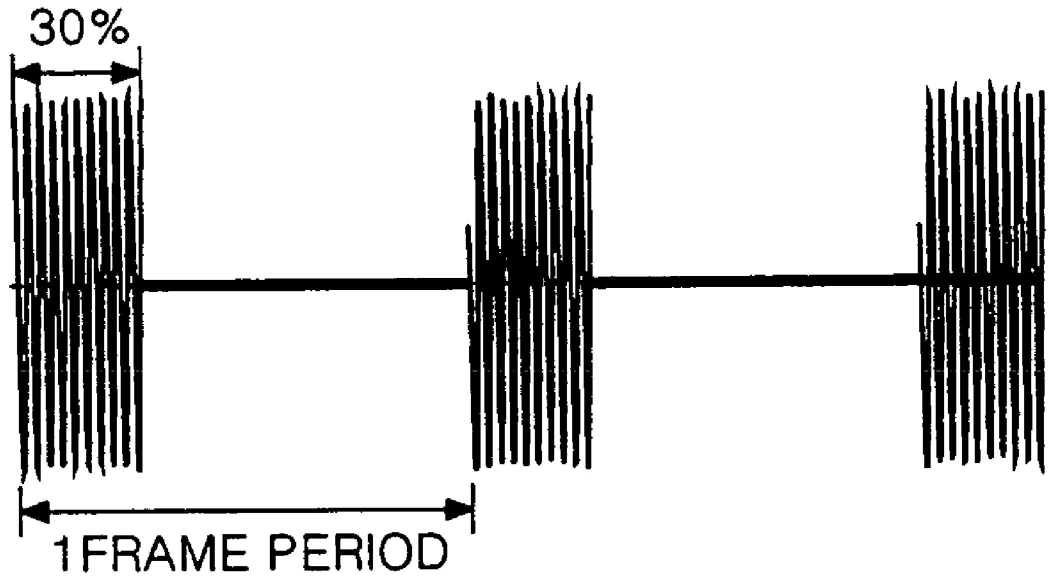
FIG. 9 is a waveform diagram of an example of a tube current in the low-brightness mode in FIG. 3.

FIG. 7 is a waveform diagram of an example of a tube current in the high-brightness mode in FIG. 3, FIG. 8 is a waveform diagram of an example of a tube current in the normal mode in FIG. 3, and FIG. 9 is a waveform diagram of an example of a tube current in the low-brightness mode in FIG. 3. As shown in FIGS. 7-9, the duration of a tube current may be differently adjusted for image data categorized in the normal mode, the high brightness mode, and the low brightness mode. For example, the duration of a tube current corresponding to image data in the high brightness mode, as shown in FIG. 7, is longer than image data in the normal mode and in the low brightness mode.

In addition, the duration of a tube current corresponding to image data in the normal mode, as shown in FIG. 8, is longer than image data in the low brightness mode. The duration of a tube current corresponding to image data in the normal mode may be about 60% of a frame period in comparison with image data in the high brightness mode.

Further, the duration of a tube current corresponding to image data in the low brightness mode, as shown in FIG. 9, is the shortest among the three modes. The duration of a tube current corresponding to image data in the low brightness mode may be about 30% of a frame period in comparison with image data in the high brightness mode. As a result, it is possible to reduce power consumption of the liquid crystal display panel, to thereby improve display efficiency.

Figure 10:
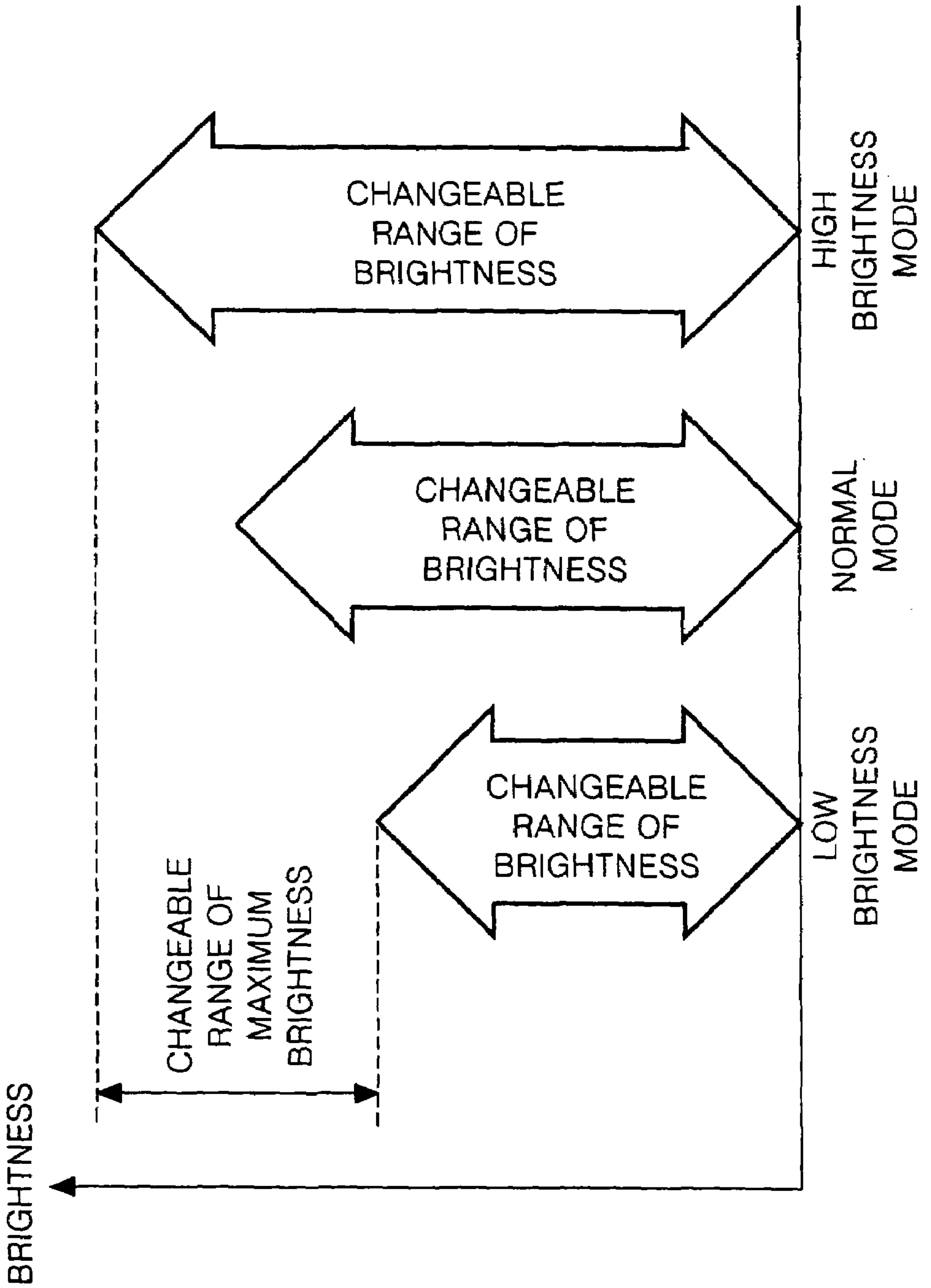
FIG. 10 is a configuration representing a changeable range of the brightness and a maximum brightness in the low-brightness mode, the normal mode and the high-brightness mode according to an embodiment of the present invention.

FIG. 10 is a configuration representing a changeable range of the brightness and a maximum brightness in the low-brightness mode, the normal mode and the high-brightness mode according to an embodiment of the present invention. As shown in FIG. 10, the changeable range of brightness of the back-light-unit lamps may be differently adjusted for image data categorized in the normal mode, the high brightness mode, and the low brightness mode. For example, the changeable range of brightness corresponding to image data in the high brightness mode is larger than image data in the normal mode and in the low brightness mode. In addition, the changeable range of brightness corresponding to image data in the normal mode is larger than image data in the low brightness mode. As a result, it is possible to increase the maximum brightness and a contrast ratio for a display image, to thereby improve display quality.

Figure 11:
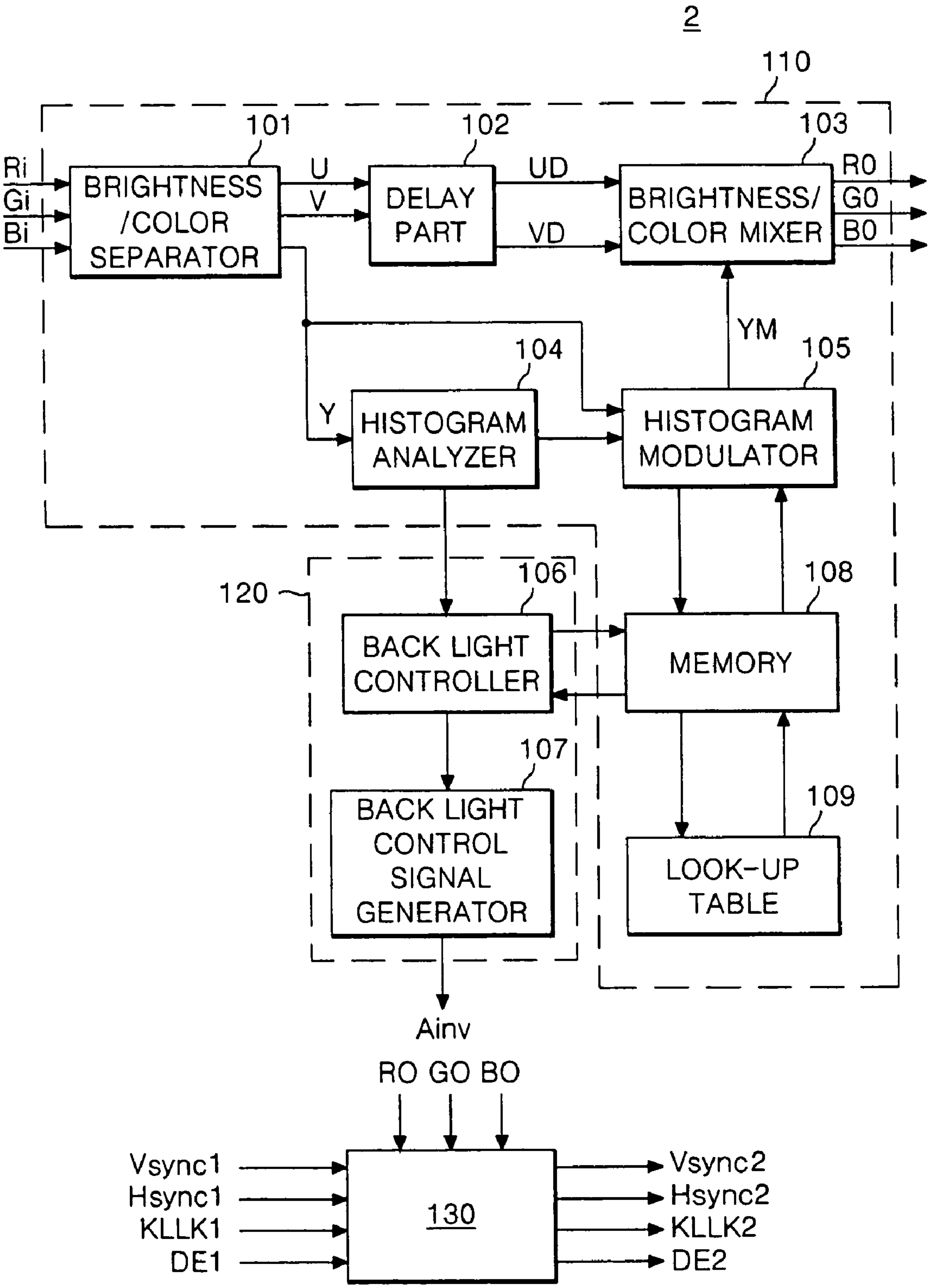
FIG. 11 is a circuit diagram of the picture quality processor in FIG. 2.
Figure 12:
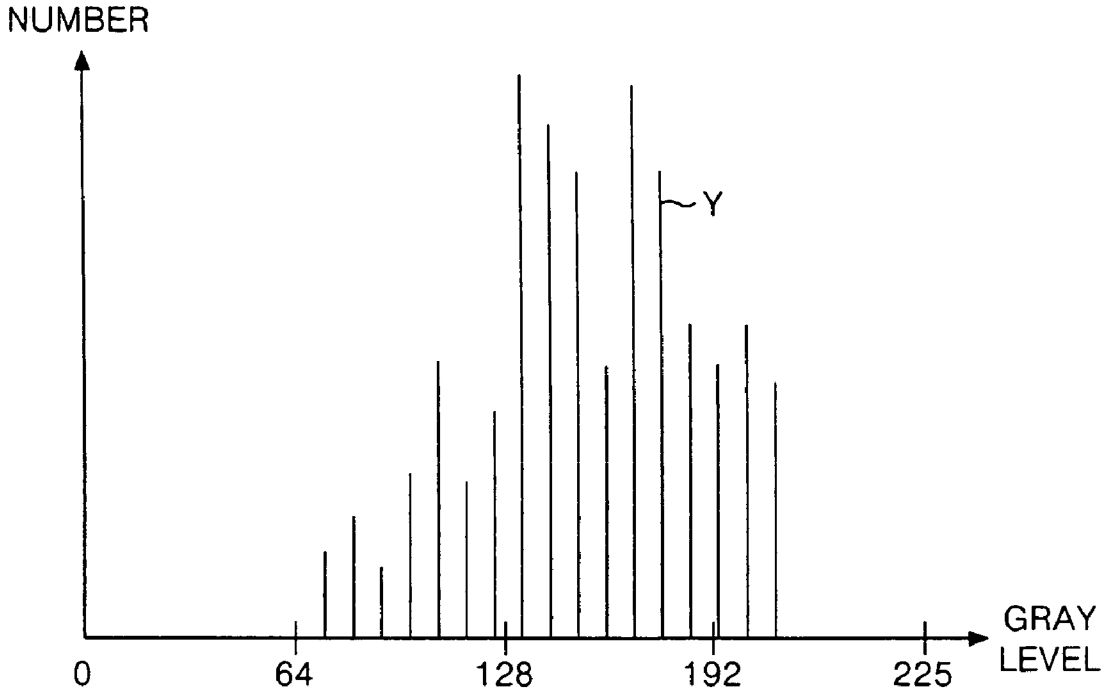
FIG. 12 is a graph of an example of a histogram in an input image.
Figure 13:
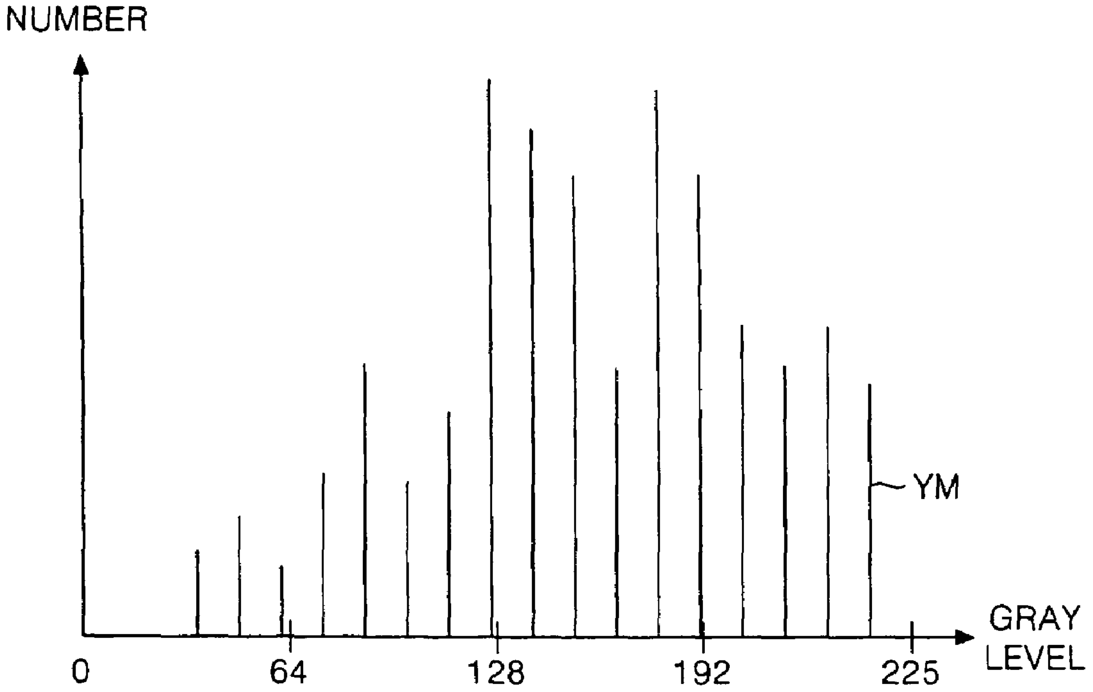
FIG. 13 is a graph of an example of a histogram enlarged by a data modulation.

FIG. 11 is a circuit diagram of the picture quality processor in FIG. 2. FIG. 12 is a graph of an example of a histogram in an input image, and FIG. 13 is a graph of an example of a histogram enlarged by a data modulation. In FIG. 11, the picture quality processor 2 may include an image signal modulator 110, a back light controller means 120, and a timing control signal generator 130. The image signal modulator 110 may include a brightness/color separator 101, a delay part 102, a brightness/color mixer 103, a histogram analyzer 104, a histogram modulator 105, a memory 108, and a look-up table 109. The image signal modulator 110 may receive the digital video data, Ri, Gi, and Bi, from the system 1 and may calculate the histogram of the digital video data Ri, Gi and Bi from the system 1 and then enlarge the histogram. Also, the image signal modulator 110 enlarges a dynamic range of the digital video data Ri, Gi and Bi pursuant to the enlarged histogram.

The brightness/color separator 101 may extract a brightness component Y and color/chromatic components U and V from the digital video data, Ri, Gi, and Bi, received from the system 1. The brightness/color separator 101 then may provide the brightness component Y to the histogram analyzer 104 and the color components U and V to the delay part 102. In addition, the brightness/color separator 101 may extract the brightness component Y and the color components U and V using the following formulas 1-3:

$$Y=0.229\times Ri+0.587\times Gi+0.114\times Bi \quad (1)$$

$$U=0.493\times(Bi-Y) \quad (2)$$

$$V=0.887\times(Ri-Y) \quad (3)$$

The histogram analyzer 104 may detect a frequency of each gray scale level that occurred within each frame and may produce a histogram of the brightness component Y for each frame. FIG. 12 is an exemplary example of the histogram produced by the histogram analyzer 104 having an X-axis of gray scale level and a Y-axis of number of occurrence. The histogram analyzer 104 may then detect a brightness degree for the image data by analyzing the histogram. In addition, the histogram analyzer 104 may produce brightness information, e.g., a minimum value, a maximum value and an average value of the brightness, of an image based on the histogram analysis and may apply the brightness information to the back light controller means 120 and the histogram modulator 105.

The histogram modulator 105 may retrieve a predetermined modulated brightness data YM from the look-up table 109 based on the brightness information received from the histogram analyzer 104. In particular, the histogram modulator 105 may enlarge the histogram, as shown in FIG. 13, to thereby enlarge a contrast ratio of an image. The data having low gray scale in the digital video data, Ri, Gi, and Bi, may be modulated to a lower gray scale by the enlarged histogram, while the data having high gray scale may be modulated to a higher gray scale, to thereby enlarge the dynamic range.

The look-up table 109 may include a ROM (not shown) and have predetermined modulated brightness data YM corresponding to the brightness component Y for an input image and an inverter control data determined in accordance with the histogram mode categorized as shown in FIGS. 4 to 6. The inverter control data may include a controlling data for setting the duty ratio of the lamp tube current of the back light unit 8 in accordance with the histogram mode and a controlling data for setting the intensity of the tube current in accordance with the histogram mode.

The memory 108 may include a RAM and may load the look-up table 109 upon the request from the histogram modulator 105 or upon the request from the back light controller means 120. In addition, the memory 108 may retrieve the data indicated by an address data of the histogram modulator 105 and the back light controller means 120 from the look-up table 109, and then may provide the data to the histogram modulator 105 and/or the back light controller means 120.

The delay part 102 may delay the color components U and V during the operation of the histogram analyzer 104 and the operation of the histogram modulator 105 to synchronize the modulated brightness component YM and the color components U and V. In addition, the brightness/color mixer 103 may produce red data, green data and blue data using the modulated brightness components YM and the delayed color components U and V as illustrated in the following formulas 4-6 shown below to generate the modulated digital video data Ro, Go, and Bo, whose dynamic range is enlarged.

$$R=YM+(0.000\times U)+(1.140\times V) \quad (4)$$

$$G=YM-(0.396\times U)-(0.581\times V) \quad (5)$$

$$B=YM+(2.029\times U)+(0.000\times V) \quad (6)$$

The back light controller means 120 may include a back light controller 106 and a back light control signal generator 107. The back light controller 106 may read the inverter control data from the look-up table 109 in accordance with the brightness information from the histogram analyzer 104 to supply the inverter control data to the back light control signal generator 107. Further, the back light control signal generator 107 may generate the inverter control signal Ainv for controlling the lamp tube current provided from the inverter 10 in accordance with the inverter control data from the back light controller 106.

The timing control signal generator 130 may adjust the timing signals, Vsync1, Hsync1, DCLK1, and DE1, from the system 1 in accordance with the modulated digital video data, Ro, Go, and Bo, whose the dynamic range is enlarged, thereby generating the modulated timing signals, Vsync2, Hsync2, DCLK2, and DE2, synchronized with the modulated digital video data, Ro, Go, and Bo.

Figure 14:
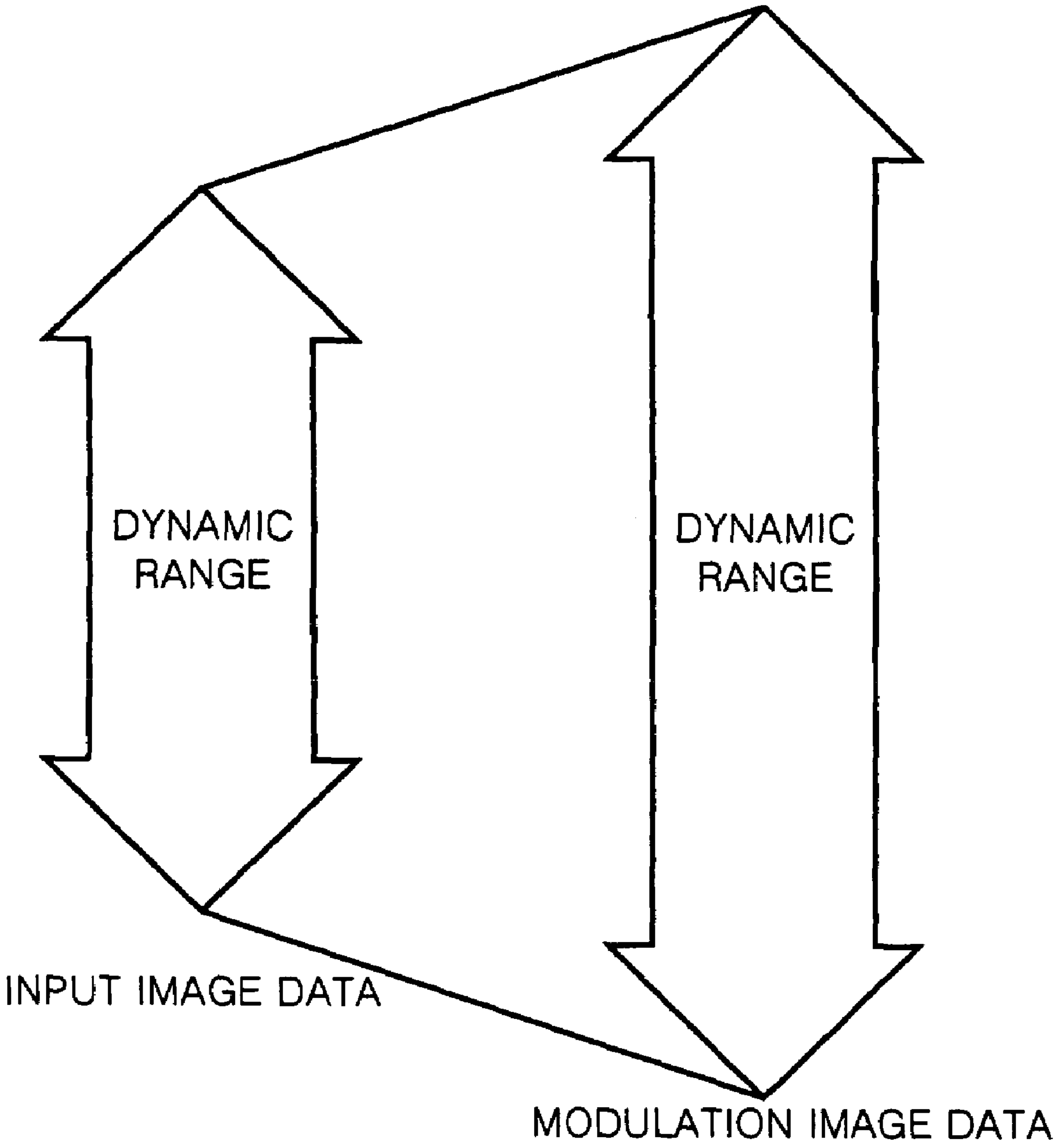
FIG. 14 is a diagram comparing a dynamic range of the input image and a dynamic range by the data modulation.

Therefore, the liquid crystal display device of the present invention may set a brightness range and a maximum brightness of the back light unit in accordance with the low brightness mode, the normal mode and the high brightness mode detected by the histogram as shown in FIG. 10. Further, the liquid crystal display device of the present invention may enlarge a dynamic range of an input image as shown in FIG. 14, to thereby enlarge a contrast ratio of a display image. Accordingly, it is possible to implement a more natural and clear image.

Meanwhile, the data modulation method for enlarging a dynamic range of an input image data in the embodiment of the invention is not limited to the above-described method. For instance, the data modulation method disclosed in Korean Patent Applications Nos. 2003-036289, 2003-040127, 2003-041127, 2003-80177, 2003-81171, 2003-81172, 2003-81173 and 2003-81175 filed by and assigned to the same applicant as the present application are also applicable to the present invention, which are incorporated herein by references.

As described above, according to the present invention of a liquid crystal display device and a controlling method thereof, the maximum brightness of a back light is adjusted in accordance with a histogram type of an input image and the dynamic range of the input image is enlarged to raise a contrast ratio and a brightness of a display image. As a result, display quality is improved. Furthermore, according to the present invention, a duty ratio of a lamp tube current and an intensity of a tube current are lowered in a low brightness mode and a normal mode, and thus, it is possible to reduce power consumption and heat generated in a back light unit.

It will be apparent to those skilled in the art that various modifications and variations can be made in the above-discussed liquid crystal display device and the controlling method thereof without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a histogram analyzer analyzing a histogram of an input image and determining the input image as being in one of a low brightness mode, a normal mode, and a high brightness mode based on the histogram analysis; and a back light controller controlling a maximum brightness of a back light unit based on the mode determination, wherein the histogram analyzer detects a most frequent value of gray scale occurring most frequently in the input image of one frame, compares the most frequent value with a predetermined low reference gray value and a predetermined high reference gray value, and determines the input image as being in one of the low brightness mode, the normal mode, and the high brightness mode based on the compared result.

2. The liquid crystal display device of claim 1, wherein the back light controller controls at least one of a duty ratio and an intensity of a tube current based on the mode determination.

3. The liquid crystal display device of claim 1, wherein the back light controller controls a duty ratio of a tube current of the back light unit lobe about 100% in comparison to one frame period and an intensity of the tube current to be about 6 mA, if the input image is determined to be in the high brightness mode based on the histogram analysis.

4. The liquid crystal display device of claim 1, wherein the back light controller controls a duty ratio of a tube current of the back light unit to be about 20-40% in comparison to one frame period and an intensity of the tube current to be about 3 mA, if the input image is determined to be in the low brightness mode based on the histogram analysis.

5. The liquid crystal display device of claim 1, wherein the back light controller controls a duty ratio of a tube current of the back light unit to be about 50-70% in comparison to one frame period and an intensity of the tube current to be about 4.5 mA, if the input image is determined to be in the normal mode based on the histogram analysis.

6. The liquid crystal display device of claim 1, wherein the back light controller controls a brightness of the back light unit to be about 400-500 nit, if the input image is determined to be in the high brightness mode based on the histogram analysis.

7. The liquid crystal display device of claim 1, wherein the back light controller controls a brightness of the back light unit to be about 200 nit, if the input image is determined to be in the low brightness mode based on the histogram analysis.

8. The liquid crystal display device of claim 1, wherein the back light controller controls a brightness of the back light unit to be about 300 nit, if the input image is determined to be in the normal mode based on the histogram analysis.

9. A liquid crystal display device, comprising:

a histogram analyzer analyzing a histogram of an input image and determining the input image as being in one of a low brightness mode, a normal mode, and a high brightness mode based on the histogram analysis;

a back light controller controlling a maximum brightness of a back light unit based on the mode determination; and a data modulator enlarging the histogram of the input image to modulate data of the input image, wherein the histogram analyzer detects a most frequent value of gray scale occurring most frequently in the input image of one frame, compares the most frequent value with a predetermined low reference gray value and a predetermined high reference gray value, and determines the input image as being in one of the low brightness mode, the normal mode, and the high brightness mode based on the compared result.

10. A method of controlling a liquid crystal display device, comprising:

analyzing a histogram of input image;

determining the input image as being in one of a low brightness mode, a normal mode, and a high brightness mode based on the histogram analysis; and controlling a maximum brightness of a back light unit based on the mode determination, wherein the step of determining the input image as being in one the low brightness mode, the normal mode, and the high brightness mode based on the histogram analysis includes:

detecting a most frequent value of gray scale occurring most frequently in the input image of one frame, comparing the most frequent value to a predetermined low reference gray value and a predetermined high reference gray value; and determining the input image as being in one of the low brightness mode, the normal mode, and the high brightness mode based on the compared result.

11. The method of claim 10, wherein the step of controlling the maximum brightness of the back light unit includes controlling at least one of a duty ratio and an intensity of a tube current based on the mode determination.

12. The method of claim 10, wherein the step of determining the input image as being in one the low brightness mode, the normal mode, and the high brightness mode based on the compared result includes:

determining the input image as in the normal mode if the most frequent value is between the predetermined low reference gray value and the predetermined high reference gray value;

determining the input image as in the high brightness mode if the most frequent value is equal to or more than the high reference gray value; and determining the input image as in the low brightness mode if the most frequent value is equal to or less than the low reference gray value.

13. The method of claim 10, wherein the step of controlling the maximum brightness includes controlling a duty ratio of a tube current of the back light unit to be about 100% in comparison to one frame period and an intensity of the tube current to be about 6 mA, if the input image is determined to be in the high brightness mode.

14. The method of claim 10, wherein the step of controlling the maximum brightness includes controlling a duty ratio of a tube current of the back light unit to be about 20-40% in comparison to one frame period and an intensity of the tube current to be about 3 mA, if the input image is determined to be in the low brightness mode.

15. The method of claim 10, wherein the step of controlling the maximum brightness includes controlling a duty ratio of a tube current of the back light unit to be about 50-70% in comparison to one frame period and an intensity of the tube current to be about 4.5 mA, if the input image is determined to be in the normal mode.

16. The method of claim 10, wherein the step of controlling the maximum brightness includes controlling a brightness of the back light unit to be about 400-500 nit, if the input image is determined to be in the high brightness mode.

17. The method of claim 10, wherein the step of controlling the maximum brightness includes controlling a brightness of the back light unit to be about 200 nit, if the input image is determined to be in the normal mode.

18. The method of claim 10, wherein the step of controlling the maximum brightness includes controlling a brightness of the back light unit to be about 300 nit, if the input image is determined to be in the low brightness mode.

19. A method of controlling a liquid crystal display device, comprising:

analyzing a histogram of an input image;

determining the input image as being in one of a low brightness mode, a normal mode, and a high brightness mode based on the histogram analysis;

controlling a maximum brightness of a back light unit based on the mode determination; and enlarging the histogram of the input image to modulate data of the input image, wherein the step of determining the input image as being in one the low brightness mode, the normal mode, and the high brightness mode based on the histogram analysis includes:

detecting a most frequent value of gray scale occurring most frequently in the input image of one frame, comparing the most frequent value to a predetermined low reference gray value and a predetermined high reference gray value; and determining the input image as being in one of the low brightness mode, the normal mode, and the high brightness mode based on the compared result.

* * * * *